(12) United States Patent
Walsh

(10) Patent No.: US 6,913,848 B2
(45) Date of Patent: Jul. 5, 2005

(54) FUEL CELL REACTANT CONTROL

(75) Inventor: Michael M. Walsh, Fairfield, CT (US)

(73) Assignee: Plug Power Inc., Latham, NY (US)

( * ) Notice: Subject to any disclaimer, the term of this patent is extended or adjusted under 35 U.S.C. 154(b) by 209 days.

(21) Appl. No.: 10/158,254

(22) Filed: May 30, 2002

(65) Prior Publication Data

US 2002/0182466 A1 Dec. 5, 2002

Related U.S. Application Data

(60) Provisional application No. 60/294,765, filed on May 31, 2001.

(51) Int. Cl.$^7$ .............................. H01M 8/04; H01M 8/06
(52) U.S. Cl. .............................. 429/26; 429/20; 429/34; 429/30
(58) Field of Search .............................. 429/20, 26, 34, 429/30

(56) References Cited

U.S. PATENT DOCUMENTS

| | | | | |
|---|---|---|---|---|
| 4,670,359 A | * | 6/1987 | Beshty et al. .................. | 429/17 |
| 5,413,878 A | * | 5/1995 | Williams et al. .............. | 429/16 |
| 5,518,828 A | * | 5/1996 | Senetar ......................... | 429/26 |
| 6,033,794 A | * | 3/2000 | George et al. ................ | 429/24 |
| 6,416,891 B1 | * | 7/2002 | Condit et al. ................. | 429/13 |
| 6,468,683 B1 | * | 10/2002 | Menzer et al. ............... | 429/26 |
| 2003/0072984 A1 | * | 4/2003 | Saloka et al. ................ | 429/26 |

OTHER PUBLICATIONS

Kordesch et al. Fuel Cells and Their Applications (pp. 52–53) 1996 (no month).*

* cited by examiner

*Primary Examiner*—Tracy Dove
(74) *Attorney, Agent, or Firm*—Trop, Pruner & Hu, P.C.

(57) ABSTRACT

The invention generally relates to controlling the temperature and relative humidity of an incoming fuel cell reactant stream. In one aspect, a fuel cell system is provided that includes a fuel cell having an anode inlet adapted to receive a flow of anode gas from an anode inlet conduit, and a cathode inlet adapted to receive a flow of cathode gas from a cathode inlet conduit. A first heat exchange surface is adapted to contact the flow of anode gas within the anode inlet conduit, and a second heat exchange surface adapted to contact the flow of cathode gas within the cathode inlet conduit. A coolant system is adapted to circulate a coolant through a coolant conduit. The coolant system is adapted to transfer heat from each of the first and second heat exchange surfaces to the coolant.

15 Claims, 3 Drawing Sheets

FUEL CELL REACTANT CONTROL

CROSS REFERENCE TO RELATED APPLICATIONS

This application claims priority under 35 USC 119(e) from U.S. Provisional Application No. 60/294,765, filed May 31, 2001, naming Walsh as inventor, and titled "FUEL CELL REACTANT CONTROL." That application is incorporated herein by reference in its entirety and for all purposes.

BACKGROUND

The invention generally relates to controlling the temperature and relative humidity of an incoming fuel cell reactant stream.

A fuel cell is an electrochemical device that converts chemical energy produced by a reaction directly into electrical energy. For example, one type of fuel cell includes a polymer electrolyte membrane (PEM), often called a proton exchange membrane, which permits only protons to pass between an anode and a cathode of the fuel cell. At the anode, hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

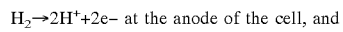
$H_2 \rightarrow 2H^+ + 2e^-$ at the anode of the cell, and

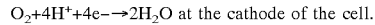
$O_2 + 4H^+ + 4e^- \rightarrow 2H_2O$ at the cathode of the cell.

A typical fuel cell has a terminal voltage of up to about one volt DC. For purposes of producing much larger voltages, multiple fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow field plates (graphite composite or metal plates, as examples) that are stacked one on top of the other. The plates may include various surface flow channels and orifices to, as examples, route the reactants and products through the fuel cell stack. A PEM is sandwiched between each anode and cathode flow field plate. Electrically conductive gas diffusion layers (GDLs) may be located on each side of each PEM to act as a gas diffusion media and in some cases to provide a support for the fuel cell catalysts. In this manner, reactant gases from each side of the PEM may pass along the flow channels and diffuse through the GDLs to reach the PEM. The PEM and its adjacent pair of catalyst layers are often referred to as a membrane electrode assembly (MEA). An MEA sandwiched by adjacent GDL layers is often referred to as a membrane electrode unit (MEU).

A fuel cell system may include a fuel processor that converts a hydrocarbon (natural gas or propane, as examples) into a fuel flow for the fuel cell stack. For a given output power of the fuel cell stack, the fuel flow to the stack must satisfy the appropriate stoichiometric ratios governed by the equations listed above. Thus, a controller of the fuel cell system may monitor the output power of the stack and based on the monitored output power, estimate the fuel flow to satisfy the appropriate stoichiometric ratios. In this manner, the controller regulates the fuel processor to produce this flow, and in response to controller detecting a change in the output power, the controller estimates a new rate of fuel flow and controls the fuel processor accordingly.

The fuel cell system may provide power to a load, such as a load that is formed from residential appliances and electrical devices that may be selectively turned on and off to vary the power that is demanded by the load. Thus, the load may not be constant, but rather the power that is consumed by the load may vary over time and abruptly change in steps. For example, if the fuel cell system provides power to a house, different appliances/electrical devices of the house may be turned on and off at different times to cause the load to vary in a stepwise fashion over time.

Certain membranes used in PEM fuel cells, such as membranes derived from sulfonated fluorocarbon polymers, require the membrane to remain hydrated to function properly. In such systems, maintaining membrane hydration is critical to membrane longevity, reliability, performance, and even safety in some cases. In such systems, generally the less a membrane is hydrated, the less effective it will be at transporting ions from anode to cathode in the fuel cell reaction. Subsaturated membranes can also become brittle and can eventually develop holes through which the hydrogen and oxygen reactants can directly interact, which can exacerbate the problem through the heat generated from direct hydrogen oxidation, and in some cases, fire can even result in this manner if a membrane is allowed to operate without adequate hydration.

In such systems, the fuel cell operating temperature is generally about 50–100° C. (e.g., 80° C.). The fuel and oxidant reactant streams are generally supplied to the fuel cell at around this temperature range. Where reformate is used as a hydrogen fuel source, is generally saturated with water when it reaches the fuel cell since it has usually been cooled from a saturated state in a fuel processing reactor at a higher temperature. Where ambient air is used as an oxidant stream for a fuel cell, it is generally preheated and humidified with steam or by some other method such as an enthalpy wheel. In this context, a stream is referred to as saturated if it has a relative humidity of 100% for a given temperature. Similarly, the temperature at which a gas is saturated is referred to as the dew point temperature of the gas.

It will be appreciated that if a saturated reactant stream is cooled once it enters a fuel cell, then water will tend to condense from the stream. This can cause problems if the liquid water in the fuel cell blocks reactants from reaching the MEA, "flooding" the cell. Conversely, if a reactant stream is subsaturated as it enters a fuel cell, it will tend to remove water from the fuel cell as it passes through (e.g., either from the water produced at the cathode or from the membrane itself). Another factor affecting the water balance in a fuel cell is that the fuel cell reaction generally produces a variable amount of heat, depending for example on the operating condition of the membrane. For this reason, a coolant is generally circulated around a fuel cell to maintain the operating temperature of the fuel cell at a given point. Typically, the fuel cell temperature will increase from inlet to outlet by a degree affected by the flow rates, coolant temperature, etc.

Also, as previously indicated, one molecule of water is produced at the cathode for every molecule of hydrogen that is reacted at the anode. Thus, a significant amount of water is generated in a fuel cell as it is operated. Since hydrated fuel cell membranes such as Nafion are also generally very effective as water transport membranes, water can generally diffuse freely throughout a membrane as a fuel cell is operated. These factors and others can contribute to a very complex and dynamic water balance in and around a fuel cell.

There is a continuing need for fuel cell systems addressing concerns and objectives including the foregoing in a robust and cost effective manner.

SUMMARY

The invention generally relates to controlling the temperature and relative humidity of an incoming fuel cell reactant stream. In one aspect, a fuel cell system is provided that includes a fuel cell having an anode inlet adapted to receive a flow of anode gas from an anode inlet conduit, and a cathode inlet adapted to receive a flow of cathode gas from a cathode inlet conduit. A first heat exchange surface is adapted to contact the flow of anode gas within the anode inlet conduit, and a second heat exchange surface is adapted to contact the flow of cathode gas within the cathode inlet conduit. A coolant system is adapted to circulate a coolant through a coolant conduit. The coolant system is adapted to transfer heat from each of the first and second heat exchange surfaces to the coolant.

Embodiments of the invention can include any of the following features, either alone or in combination For example, in some embodiments, the coolant system can further include a radiator adapted to remove heat from the coolant. The fuel cell under the present invention can make up part of a fuel cell stack. In some embodiments, the fuel cell has an operating temperature greater than a first temperature of the flow of anode gas at a location in the anode inlet conduit between the first heat exchange surface and the anode inlet of the fuel cell, where the fuel cell operating temperature is also greater than a second temperature of the flow of cathode gas at a location in the cathode inlet conduit between the second heat exchange surface and the cathode inlet of the fuel cell.

Alternatively, the fuel cell can have an operating temperature that is less than a first temperature of the flow of anode gas at a location in the anode inlet conduit between the first heat exchange surface and the anode inlet of the fuel cell, wherein the fuel cell operating temperature is also less than a second temperature of the flow of cathode gas at a location in the cathode inlet conduit between the second heat exchange surface and the cathode inlet of the fuel cell.

In some embodiments, it is preferable that the flow of anode gas at the fuel cell anode inlet has a relative humidity greater than 95% (e.g., greater than 98%), and that the flow of cathode gas at the fuel cell cathode inlet also has a relative humidity greater than 95% (e.g., greater than 98%).

In some embodiments, a first temperature of the flow of anode gas at a location in the anode inlet conduit between the first heat exchange surface and the anode inlet of the fuel cell is maintained within 5.0° C. of a second temperature of the flow of cathode gas at a location in the cathode inlet conduit between the second heat exchange surface and the cathode inlet of the fuel cell.

The first heat exchange surface referred to previously can be part of a first heat exchanger adapted to transfer heat from the flow of anode gas to the coolant. Likewise, the second heat exchange surface can be part of a second heat exchanger adapted to transfer heat from the flow of cathode gas to the coolant.

Embodiments may further include a first condensate drain adapted to remove condensate from the anode inlet conduit at a location between the first heat exchanger and the fuel cell anode inlet. A second condensate drain may also be included that is adapted to remove condensate from the cathode inlet conduit at a location between the second heat exchanger and the fuel cell cathode inlet.

Fuel cells under the invention can include a polymer electrolyte membrane adapted to react reformate as an anode gas. The flow of cathode gas can include air. In some embodiments, the cathode inlet conduit of the fuel cell can be connected to an outlet of an enthalpy wheel. In other embodiments, the cathode inlet conduit of the fuel cell can be connected to an outlet of a cathode gas humidifier.

In some embodiments, the flow of anode gas at a location in the anode inlet conduit between the first heat exchange surface and the anode inlet of the fuel cell has a first dew point temperature; the flow of cathode gas at a location in the cathode inlet conduit between the second heat exchange surface and the cathode inlet of the fuel cell has a second dew point temperature; and the fuel cell has an operating temperature within 5.0° C. of each of the first and second dew point temperatures.

In another aspect, the invention provides a fuel cell system including a fuel cell stack having an anode inlet and a cathode inlet; an anode inlet condenser and a cathode inlet condenser; an anode conduit adapted to flow an anode gas through the anode inlet condenser to the anode inlet of the fuel cell stack; and a cathode conduit adapted to flow a cathode gas through the cathode inlet condenser to the cathode inlet of the fuel cell stack. A first outlet temperature of the anode inlet condenser has a first temperature within 5.0° C. of an operating temperature of the fuel cell stack, and a second outlet temperature of the cathode inlet condenser has a second temperature within 5.0° C. of the operating temperature of the fuel cell stack. In some embodiments, a coolant circuit adapted to remove heat from each of the anode inlet condenser, the cathode inlet condenser and the fuel cell stack.

In another aspect, the invention provides a method of operating a fuel cell system, including the following steps: cooling a fuel flow having a first dew point temperature to a second temperature below the first dew point temperature; cooling an oxidant flow having a third dew point temperature to a fourth temperature below the third dew point temperature; flowing the fuel through an anode chamber of a fuel cell; and flowing the oxidant through a cathode chamber of a fuel cell.

Embodiments of such methods may further include flowing a first condensate from the oxidant flow to a condensate reservoir; and flowing a second condensate from the fuel flow to the condensate reservoir. Another step may include heating the oxidant flow prior to cooling the oxidant flow. Another step may include combining the oxidant flow with water vapor prior to cooling the oxidant flow. Still another step can include transferring heat from the fuel flow to a coolant flow; and transferring heat from the oxidant flow to the coolant flow.

As an additional feature, where the fuel cell has an operating temperature, the fuel flow has a fuel temperature, the oxidant flow has an oxidant temperature, and the coolant flow has a coolant temperature, each of the fuel flow, oxidant flow and coolant flow can be maintained within 5.0° C. of the fuel cell operating temperature.

Methods under the invention can further include any of the steps, features and design aspects described herein, alone or in combination.

In another aspect, the invention provides a fuel cell system, including a fuel cell having an anode inlet adapted to receive a flow of anode gas from an anode inlet conduit; a heat exchange surface adapted to contact the flow of anode gas within the anode inlet conduit; and a coolant system adapted to circulate a coolant through a coolant conduit, wherein the coolant system is adapted to transfer heat from the heat exchange surface to the coolant.

In another aspect, the invention provides a fuel cell system, including a fuel cell having a cathode inlet adapted to receive a flow of cathode gas from a cathode inlet conduit; a heat exchange surface adapted to contact the flow of cathode gas within the cathode inlet conduit; and a coolant system adapted to circulate a coolant through a coolant conduit, wherein the coolant system is adapted to transfer heat from the heat exchange surface to the coolant.

Advantages and other features of the invention will become apparent from the following description, drawing and claims.

DETAILED DESCRIPTION

The invention may include any of the following aspects and features, alone or in combination.

Figure 1:
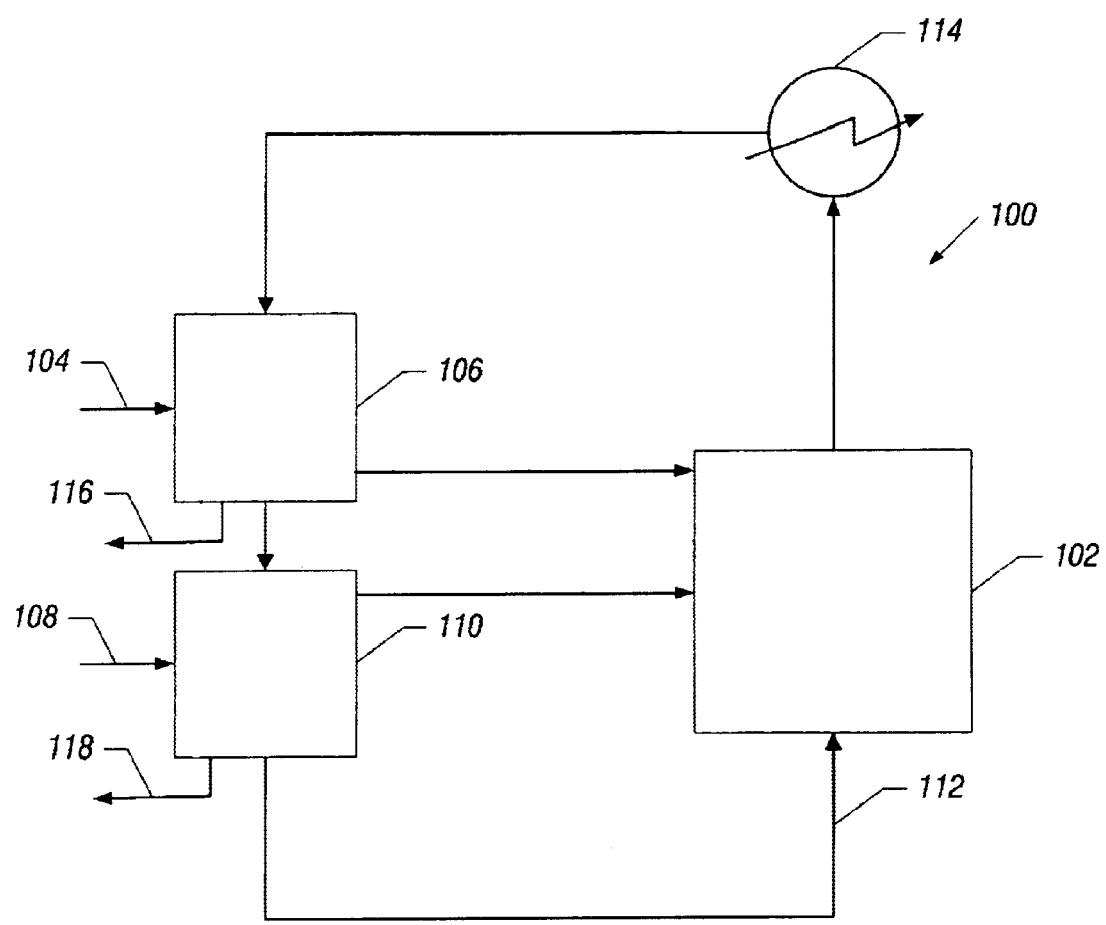
FIG. 1 is a schematic diagram illustrating a fuel cell system in accordance with the present invention.

Referring to FIG. 1, in one embodiment, the fuel cell system 100 can include a fuel cell stack 102, a source of humidified fuel 104, such as a fuel processor, a condenser 106 in the path of the humidified fuel before it enters the fuel cell stack 102, a source 108 of humidified oxidant, a condenser 110 in the path of the humidified oxidant before it enters the fuel cell stack 102, a cooling circuit 112 with suitable coolant circulating means (e.g., a pump) and a suitable heat sink 114 (e.g. a radiator or combined heat and power system).

The coolant, driven by the circulating means, flows from the heat sink 114 through the condensers 106 and 110, through the fuel cell stack 102 and back to the heat sink 114. In one embodiment, the coolant flows first through the condenser 106 in the humidified fuel stream 104, then through the condenser 110 in the humidified oxidant stream 108, and then through the fuel cell stack 102. The humidified fuel 104 and humidified oxidant 108 are supplied at a dew point above the intended normal operating temperature of the stack 102. As the coolant passes through the condenser 106 in the humidified fuel stream 104 it condenses out a portion of the water vapor in the fuel stream 104, slightly warming the coolant. The condensate may also be collected for use elsewhere in the system, for example via condensate drain 116. As the coolant passes through the condenser 110 in the humidified oxidant stream 108, it condenses out a portion of the water vapor in the humidified oxidant stream 108, slightly warming the coolant. The condensate may also be collected for use elsewhere in the system, for example via condensate drain 118. As the warmed coolant passes through the stack 102, it establishes the stack operating temperature at a value slightly higher than the dew points of the incoming reactants 104, 108.

In an alternate embodiment, a reformer (not shown) may be used to provide humidified fuel 104 to the fuel cell stack 102. The dew point of the fuel 104 is typically higher than the desired stack entry condition. Similarly if an enthalpy wheel or other enthalpy recovery device (not shown) is used to provide humidified oxidant 108 to the fuel cell stack, the dew point of the oxidant is typically higher than the desired stack entry condition. Use of condensers 106 and 110 in accordance with the present invention link the fuel dew point, the oxidant dew point, and the stack operating temperature together, thereby reducing or eliminating the need to precisely control the temperatures of the three independent flows to maintain the proper relative temperatures.

Use of a passive control system in accordance with the present invention provides other advantages. During system warm-up, resistance to flooding in the stack is improved since the cold coolant extracts latent heat from the reactants, lowering their dew points, and sinks at least a portion of that latent heat into the stack. Warming the stack and lowering the dew points of the reactants reduces the tendency for condensate to collect in the stack. On extremely hot days when maximum power is required, the coolant temperature returning from the heat sink may increase. The higher coolant temperature reduces the effectiveness of the condensers in the fuel and oxidant streams causing the dew point of both streams to increase by roughly the same amount as the increase in coolant temperature. Increasing the dew points of the reactants greatly reduces the tendency for the stack membranes to dry out.

Figure 2:
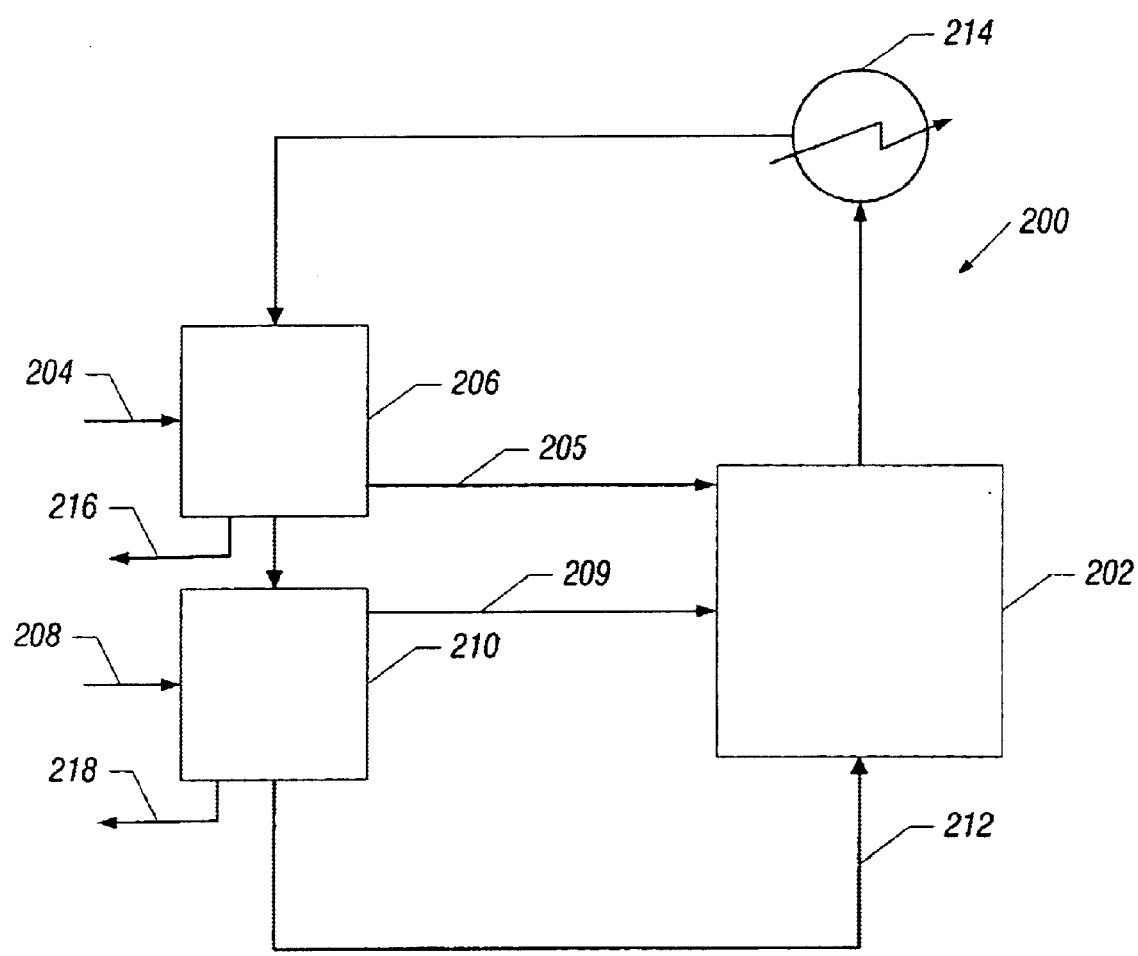
FIG. 2 is a schematic diagram illustrating a fuel cell system in accordance with the present invention.

Referring to FIG. 2, a schematic diagram is shown illustrating a fuel cell system 200 in accordance with the present invention. A fuel cell 202 has an anode inlet 205 adapted to receive a flow of anode gas from an anode inlet conduit 204, and a cathode inlet 209 adapted to receive a flow of cathode gas from a cathode inlet conduit 208. A first heat exchange surface 206 is adapted to contact the flow of anode gas within the anode inlet conduit 204, and a second heat exchange surface 210 is adapted to contact the flow of cathode gas within the cathode inlet conduit 208. A coolant system is adapted to circulate a coolant through a coolant conduit 212. The coolant system is adapted to transfer heat from each of the first and second heat exchange surfaces 206, 210 to the coolant. The coolant flow through conduit 212 is generally motivated by a pump. As an example, the coolant can be a dielectric fluid such as deionized water or purified glycol.

In this example, heat exchange surfaces 206 and 210 are provided as part of a set of liquid-to-liquid plate heat exchangers. Other heat exchanger configurations are also possible, such as shell and tube heat exchangers and other designs. The heat exchange surfaces 206 and 210 contact the reactant gas inlet conduits 204 and 208, respectively, and serve to transfer heat from the reactant gasses to the coolant in coolant conduit 212. Also, heat transfer surfaces 206 and 210 can also be present in a common housing, such as a heat exchanger adapted to transfer heat from both conduits 204 and 208 to coolant conduit 212.

In the embodiment shown in FIG. 2, the fuel cell 202 has an operating temperature greater than a temperature (first temperature) of the flow of anode gas at a location 205 in the anode inlet conduit between the first heat exchange surface 206 and the anode inlet of the fuel cell 202, where the fuel cell operating temperature is also greater than a temperature (second temperature) of the flow of cathode gas at a location 209 in the cathode inlet conduit between the second heat exchange surface 210 and the cathode inlet of the fuel cell 202.

In other embodiments, the fuel cell 202 can have an operating temperature that is less than a first temperature of the flow of anode gas at a location 205 in the anode inlet conduit between the first heat exchange surface 206 and the anode inlet of the fuel cell 202, where the fuel cell operating temperature is also less than a second temperature of the flow of cathode gas at a location 209 in the cathode inlet conduit between the second heat exchange surface 210 and the cathode inlet of the fuel cell 202.

In the example shown in FIG. 2, a radiator 214 is provided to transfer heat from the coolant conduit 212 to ambient to maintain desired coolant and fuel cell temperatures.

The flow of anode gas at the fuel cell anode inlet 205 has a relative humidity greater than 98%, and the flow of cathode gas at the fuel cell cathode inlet also has a relative humidity greater than 98%. The relative humidity is maintained at this level to prevent the reactant gasses from drying the membranes in the fuel cell 202. Other systems with different operating conditions and associated water balance concerns may be adjusted to different temperature and relative humidity parameters to accommodate similar concerns.

A first temperature of the flow of anode gas at a location in the anode inlet conduit 205 between the first heat exchange surface 206 and the anode inlet of the fuel cell 202 is maintained within 5.0° C. of a second temperature of the flow of cathode gas at a location in the cathode inlet conduit 209 between the second heat exchange surface 210 and the cathode inlet of the fuel cell 202. This feature enhances control of the water balance within the fuel cell 202, however, other embodiments may not include this feature.

A first condensate drain 216 is provided to remove condensate from the anode inlet conduit 204. The condensate drain 216 could also be located in the heat exchanger associated with the first heat transfer surface 206, or elsewhere as desired, such as at a location between the first heat exchanger and the fuel cell anode inlet. A second condensate drain 218 is also provided to remove condensate from the cathode inlet conduit 208. The condensate drain 218 could also be located in the heat exchanger associated with the second heat transfer surface 210, or elsewhere as desired, such as at a location between the second heat exchanger and the fuel cell cathode inlet.

The flow of anode gas through conduit 204 can include reformate. The flow of cathode gas through conduit 208 can include air. In some embodiments, the cathode inlet conduit of the fuel cell 208 can be connected to an outlet of an enthalpy wheel. In other embodiments, the cathode inlet conduit of the fuel cell 208 can be connected to an outlet of a cathode gas humidifier.

The flow of anode gas at a location in the anode inlet conduit 205 between the first heat exchange surface 206 and the anode inlet of the fuel cell 202 has a first dew point temperature. The flow of cathode gas at a location in the cathode inlet conduit 209 between the second heat exchange surface 210 and the cathode inlet of the fuel cell 202 has a second dew point temperature. As previously indicated, the fuel cell 202 can be configured in some embodiments to have an operating temperature within 5.0° C. of each of the first and second dew point temperatures.

Embodiments of the invention may also include only one of the heat exchange surfaces 206 and 210. For example, it may be desired to control the temperature and humidity of only the anode gas flowed to the fuel cell 202 via conduit 205, or to only control the temperature and humidity of the cathode gas flowed to the fuel cell 202 via conduit 209.

Figure 3:
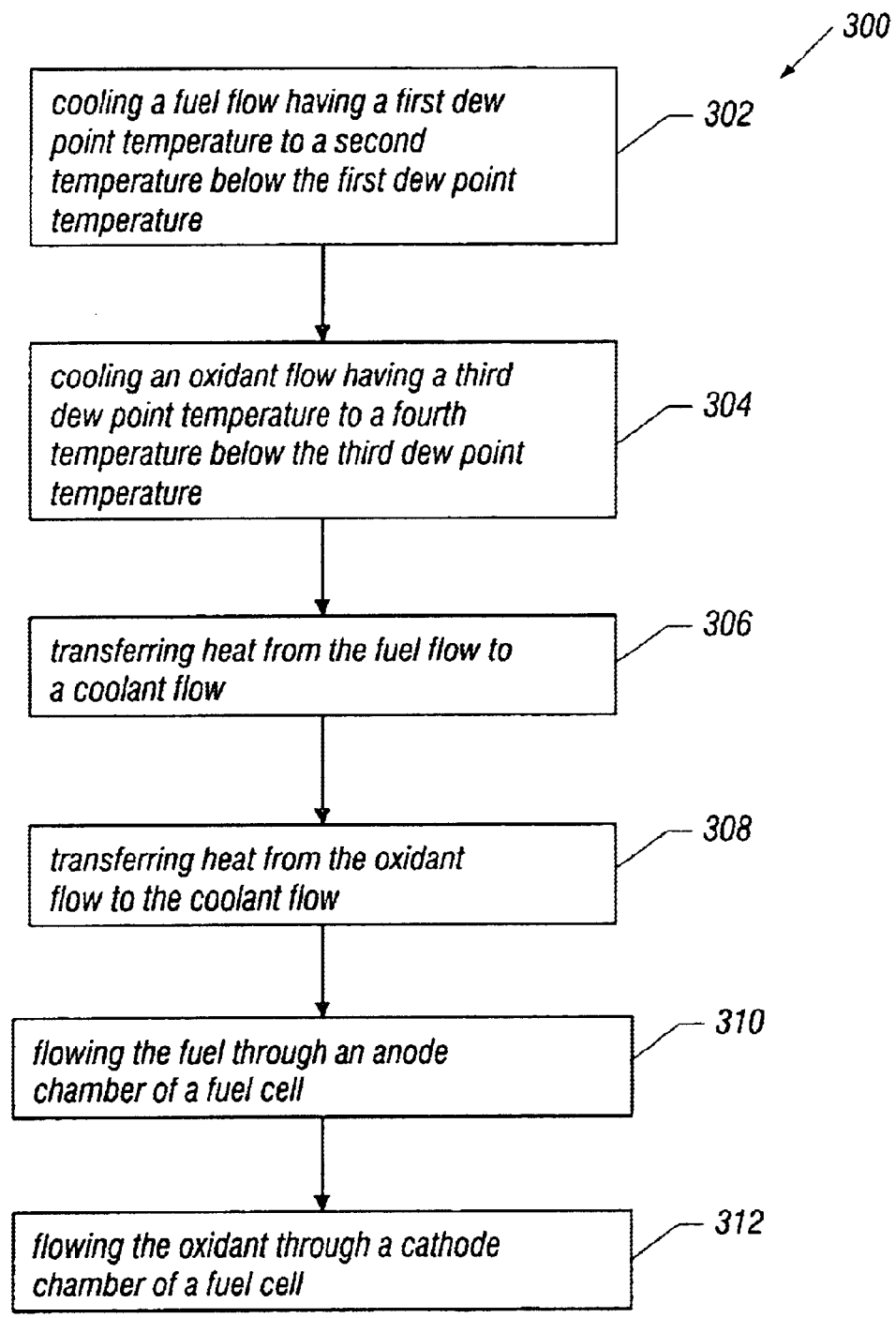
FIG. 3 is a flow diagram of a method of operating a fuel cell system under the present invention.

Referring to FIG. 3, a flow diagram is shown of a method 300 of operating a fuel cell system under the present invention, including the following steps: (302) cooling a fuel flow having a first dew point temperature to a second temperature below the first dew point temperature; (304) cooling an oxidant flow having a third dew point temperature to a fourth temperature below the third dew point temperature; (306) transferring heat from the fuel flow to a coolant flow; 308) transferring heat from the oxidant flow to the coolant flow; (308) flowing the fuel through an anode chamber of a fuel cell; and (309) flowing the oxidant through a cathode chamber of a fuel cell. Such methods under the invention can also include any of the steps, features and design aspects described herein, alone or in combination.

For example, embodiments of such methods may further include flowing a first condensate from the oxidant flow to a condensate reservoir; and flowing a second condensate from the fuel flow to the condensate reservoir. Another step may include heating the oxidant flow prior to cooling the oxidant flow. Another step may include combining the oxidant flow with water vapor prior to cooling the oxidant flow.

As an additional feature, where the fuel cell has an operating temperature, the fuel flow has a fuel temperature, the oxidant flow has an oxidant temperature, and the coolant flow has a coolant temperature, each of the fuel flow, oxidant flow and coolant flow can be maintained within 5.0° C. of the fuel cell operating temperature.

While the invention has been disclosed with respect to a limited number of embodiments, those skilled in the art, having the benefit of this disclosure, will appreciate numerous modifications and variations therefrom. It is intended that the invention covers all such modifications and variations as fall within the true spirit and scope of the invention.

What is claimed is:

1. A fuel cell system, comprising:

a fuel cell comprising a polymer electrolyte membrane, the fuel cell having an anode inlet adapted to receive a flow of anode gas from an anode inlet conduit, and a cathode inlet adapted to receive a flow of cathode gas from a cathode inlet conduit;

a first heat exchange surface adapted to contact the flow of anode gas within the anode inlet conduit;

a second heat exchange surface adapted to contact the flow of cathode gas within the cathode inlet conduit; and a coolant system adapted to circulate a coolant through a coolant conduit, wherein the coolant system is adapted to transfer heat from each of the first and second heat exchange surfaces to the coolant.

2. The system of claim 1, wherein the coolant system further comprises a radiator adapted to remove heat from the coolant.

3. The system of claim 1, wherein the fuel cell comprises a fuel cell stack.

4. The system of claim 1, wherein the fuel cell has an operating temperature greater than a first temperature of the flow of anode gas at a location in the anode inlet conduit between the first heat exchange surface and the anode inlet of the fuel cell, and wherein the fuel cell operating temperature is greater than a second temperature of the flow of cathode gas at a location in the cathode inlet conduit between the second heat exchange surface and the cathode inlet of the fuel cell.

5. The system of claim 1, wherein the fuel cell has an operating temperature less than a first temperature of the flow of anode gas at a location in the anode inlet conduit between the first heat exchange surface and the anode inlet of the fuel cell, and wherein the fuel cell operating temperature is less than a second temperature of the flow of cathode gas at a location in the cathode inlet conduit between the second heat exchange surface and the cathode inlet of the fuel cell.

6. The system of claim 4, wherein the flow of anode gas at the fuel cell anode inlet has a relative humidity greater than 95%, and wherein the flow of cathode gas at the fuel cell cathode inlet has a relative humidity greater than 95%.

7. The system of claim 5, wherein the flow of anode gas at the fuel cell anode inlet has a relative humidity greater than 95%, and wherein the flow of cathode gas at the fuel cell cathode inlet has a relative humidity greater than 95%.

8. The system of claim 5, wherein the flow of anode gas at the fuel cell anode inlet has a relative humidity greater than 98%, and wherein the flow of cathode gas at the fuel cell cathode inlet has a relative humidity greater than 98%.

9. The system of claim 1, wherein a first temperature of the flow of anode gas at a location in the anode inlet conduit between the first heat exchange surface and the anode inlet of the fuel cell is within 5.0° C. of a second temperature of the flow of cathode gas at a location in the cathode inlet conduit between the second heat exchange surface and the cathode inlet of the fuel cell.

10. The system of claim 1, wherein the first heat exchange surface comprises a first heat exchanger adapted to transfer heat from the flow of anode gas to the coolant, and wherein the second heat exchange surface is a second heat exchanger adapted to transfer heat from the flow of cathode gas to the coolant.

11. The system of claim 10, further comprising:
a first condensate drain adapted to remove condensate from the anode inlet conduit at a location between the first heat exchanger and the fuel cell anode inlet; and
a second condensate drain adapted to remove condensate from the cathode inlet conduit at a location between the second heat exchanger and the fuel cell cathode inlet.

12. The system of claim 1, wherein the flow of anode gas comprises reformate.

13. The system of claim 1, wherein the flow of cathode gas comprises air, and wherein the cathode inlet conduit is connected to an outlet of an enthalpy wheel.

14. The system of claim 1, wherein the flow of cathode gas comprises air, and wherein the cathode inlet conduit is connected to an outlet of a cathode gas humidifier.

15. The system of claim 1, wherein the flow of anode gas at a location in the anode inlet conduit between the first heat exchange surface and the anode inlet of the fuel cell has a first dew point temperature;
wherein the flow of cathode gas at a location in the cathode inlet conduit between the second heat exchange surface and the cathode inlet of the fuel cell has a second dew point temperature; and
wherein the fuel cell has an operating temperature within 5.0° C. of each of the first and second dew point temperatures.

* * * * *